Aug. 17, 1965  J. E. HENDRICKS ETAL  3,201,784
DISPLAY APPARATUS
Filed Sept. 29, 1961
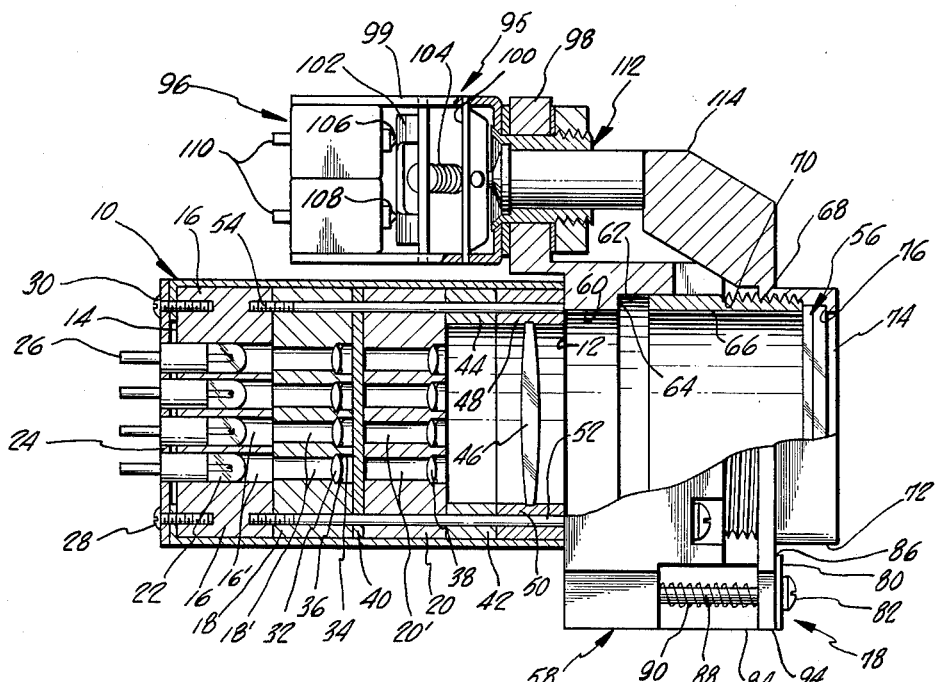
FIG. 1.
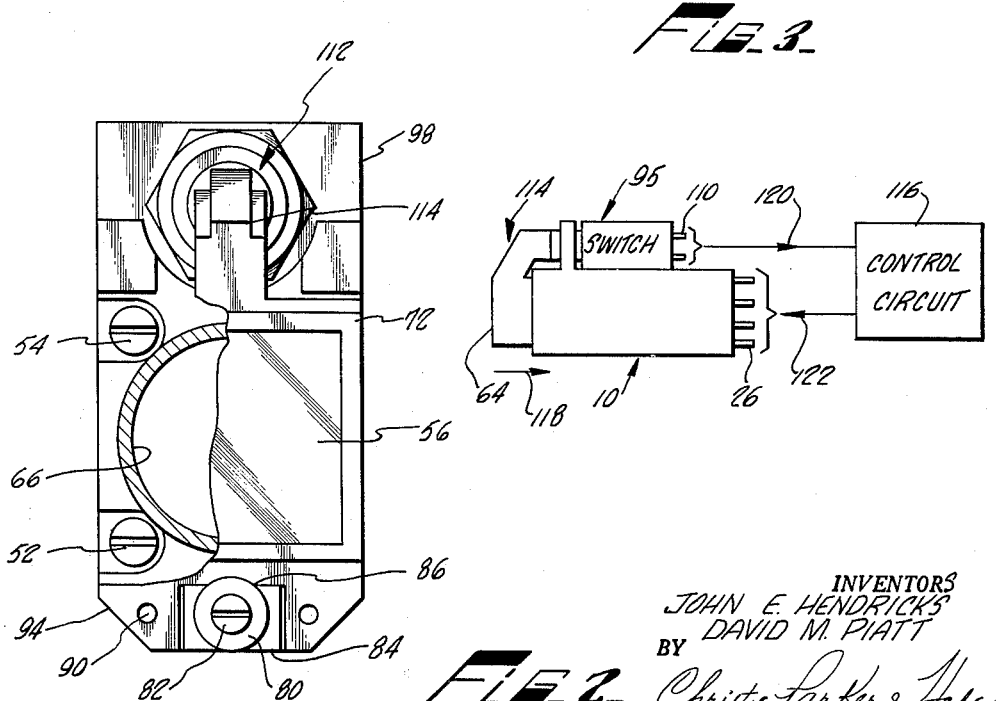
FIG. 2.
FIG. 3.
INVENTORS
JOHN E. HENDRICKS
DAVID M. PIATT
BY
Christie, Parker & Hale
ATTORNEYS.

United States Patent Office 3,201,784
Patented Aug. 17, 1965

3,201,784
DISPLAY APPARATUS
John E. Hendricks, Encino, and David M. Piatt, Reseda, Calif., assignors to Industrial Electronics Engineers, Inc., a corporation of California
Filed Sept. 29, 1961, Ser. No. 141,795
7 Claims. (Cl. 340—378)

This invention relates to improvements in display devices and, more particularly, to a display apparatus for selectively displaying symbols on the face thereof.

Units for displaying digital information in a compact single-plane panel arrangement, are well known. One type of display unit is of the image-projection type which includes a number of axially parallel projection systems in a single housing. Each projection system has a light source, a single symbol associated therewith, and a lens system for directing light from the light source to a display surface.

To project a selected symbol on the display surface, a selected one of the light sources is energized. The symbol projected on the display surface represents information which may be observed and, if necessary, acted upon by an operator. In response to the symbol, the operator may be required to perform certain operations such as closing a particular switch associated with the display unit to actuate particular control circuitry indicated by the symbol being displayed.

Thus, when such a prior art type of display unit is displaying command information in the form of symbols, at least a three-step operation is required by the operator. First, the operator must view the symbol and interpret its meaning, second, he must act to locate a particular switch indicated by the symbol, and third he must actuate the switch. In such a three-step operation, the actions of the operator are not automatic and errors in viewing the symbol, interpreting its meaning, and acting in response thereto may result.

In view of the above, the present invention contemplates a display unit including a movable display surface onto which symbols may be selectively projected. The movable display surface also constitutes a push-button switching arrangement which is to be actuated by the operator in response to symbols displayed thereon. Thus, an operator, in viewing a symbol on the display surface of the present invention, may directly proceed to press the face of the display surface, thereby actuating the exact switching operation indicated by the symbol. This simplified direct action required of an operator materially reduces operator training time as well as possible errors on the part of an operator.

Due to the combination of display and switching operations into a single unit, the display apparatus of the present invention may be termed a display switch. In providing the above simplified operation, the display switch, in a basic form, includes a housing having an opening therein. Disposed within the housing is a plurality of individually operable image-projecting systems for projecting an image through the opening. Movably mounted to the housing across the opening is a translucent viewing screen. The face of the viewing screen acts as a push-button and is movable between an inward and an outward position relative to the opening. The viewing screen is normally urged to the outward position at which the image is focused on the screen. Means for sensing the movement of the viewing screen is included in operative association with the viewing screen.

The display switch may be employed in a number of different read-out systems. For example, the display switch is particularly useful in an arrangement where the projection system of the display switch is associated with display selector circuitry while the means for sensing the movement of the viewing screen is associated with control circuitry for controlling predetermined operations as well as the display selector circuitry to determine the symbol being displayed by the display switch. In such an arrangement, the symbol displayed by the display switch indicates to the operator that the switch should be actuated. By pressing the face of the viewing screen, the screen is moved to its inward position and the movement sensing means responds to actuate the control circuitry to perform predetermined operations indicated by the symbol. At the completion of the operation the control circuitry sends a signal to the display selector circuitry which in turn energizes a particular projections system to display a different symbol on the viewing screen. This symbol may indicate that the operator is to again actuate the display switch or wait for further instructions to be displayed on the viewing screen. In either case the operator in carrying out the instructions indicated by the symbol is required merely to press the face of the viewing screen.

The display switch is also particularly useful in a system where successive actuation of the switch controls successive steps of a process. In this case, the means for sensing movement of the viewing screen is utilized both to directly control the control circuitry as well as the display selector circuitry. Thus, in response to a first symbol indicative of a first step to be taken in the process, the viewing screen is pressed by the operator. The movement of the viewing screen initiates the first step of the process, and causes a new symbol to be displayed upon the viewing screen indicating that the first step has taken place and that the process is ready for the second step. Such an operation may be repeated for the number of steps in the process.

By employing the display switch in such an arrangement the proper sequence of operation of the process is guaranteed rather than depending upon the operator to initiate the first step and then the second step before the third step, and so on.

For a more complete understanding of the display switch of the present invention, reference may be made to the following detailed description which is to be considered with the drawings, wherein:

FIGURE 1 is a sectional side view of the display switch of the present invention;

FIGURE 2 is a sectional front view of the display switch; and

FIGURE 3 is a schematic block diagram of a control system employing the display switch.

Referring to FIGURES 1 and 2 of the drawings, the display switch of the present invention includes a housing indicated generally at 10. The housing 10 preferably takes the form of a rectangular casing having two open ends 12 and 14. Mounted within the housing 10 is a plurality of image-projection systems. The image-projecting systems may be of any type which are individually operable and which project an image through the open end 12 of the housing 10 onto a viewing screen. Generally such projection systems include a number of axially parallel light sources, a single symbol associated with each light source, and a lens system for directing light from the light source to a translucent display surface. The image of a selected symbol appears on the display surface in response to an activation of its associated light source.

By way of example only, the image-projecting systems shown in FIGURE 1 are of the type described in detail in the United States Patent No. 2,931,027 issued March 29, 1960. Although for a complete understanding of the operation of the projection systems specific reference should be made to this U.S. patent, the projection system briefly includes a plurality of block elements 16, 18 and 20. Each of the block elements include a plurality of cylindrical apertures 16′, 18′ and 20′, respectively. The blocks are aligned and coupled together such that each of the apertures 16′ are aligned with an aperture 18′ and an aperture 20′.

A light source 22 is positioned in each aperture 16′. Each light source 22 is coupled to a terminal plate 24 having a plurality of electrical terminals 26. One terminal is associated with each light source. The terminal plate 24 encloses the open end 14 of the housing 10 and is coupled to the housing by screws 28 and 30.

Included in each of the apertures 18′ is a biconvex condensing lens 32. The condensing lens 32 is inserted into a recess 34 which is counterbored in the aperture 18′. The lens 32 is held in place by a retaining spring 36 or other suitable means.

In a like manner, single channel objective lenses 38 are held in place within counterbored openings in the block 20.

Positioned between the blocks 18 and 20 is a negative film 40 having symbols thereon which are to be displayed. Each symbol is aligned between associated apertures 18′ and 20′ in the lens arrangement.

Spaced from the third block 20 by spacers, two of which are represented at 42 and 44, is a multi-channel projecting lens 46. The lens 46 is held by upper and lower mounting blocks 48 and 50 which are grooved to mate with the upper and lower extremities of the lens 46. The series of blocks and spacers are held together by screws such as indicated at 52 and 54.

To operate a projection system a one of the electrical terminals 26 is selectively energized. Energizing a terminal 26 excites a particular light source. Light emitted from the light source passes through an associated aperture 18′ in the block 18 and a condensing lens 32. Light in passing through the condensing lens 32, is condensed onto a symbol in the negative 40. An image of the particular symbol is projected through an associated aperture 20′ in the block 20 and an objective lens 38 to the multi-channel projecting lens 46. The lens 46 focuses the image of the symbol through the open end 12 of the housing 10.

To display the image, a viewing screen represented at 56 is movably mounted across the open end 12 of the housing 10. To so mount the viewing screen, a mounting member represented generally at 58 is coupled to the open end of the housing 10 by the screws 52 and 54. The mounting member includes an inner bore 60 and an outer bore 62 which communicate with the open end 12 of the housing 10. The junction of the inner bore 60 and the outer bore 62 defines a shoulder 64 which acts in a manner hereinafter described as a stop means to limit movement of the viewing screen 56 toward the housing 10.

Positioned for slidable movement within the outer bore 62 is a guide tube 66. An external portion 68 of the tube 66 is threaded and mates with an internally threaded portion 70 of a framing member 72. The framing member 72 is shaped in the form of a rectangular frame having an opening 74 surrounded by an inwardly flanged edge 76. When the framing member is threaded to the guide tube 66 the opening 74 communicates with the opening 12 in the housing 10.

The viewing screen 56, which is composed of a translucent material such as Lucite for receiving an image from the rear which may be viewed from the front, is positionable into the framing member 72 and is supported within the rectangular frame across the opening 74 by the inwardly extending flange 76. To maintain the viewing screen 56 within the frame across the opening 74, the guide tube 66 is threaded into the internally threaded portion 70 of the framing member 72 and abuts the viewing screen thereby securing the viewing screen within the framing member.

With the viewing screen 56 so mounted in the framing member 72, the tube 66 is movable into and out of the outer bore 62 of the mounting member 58 in response to a force applied to the face of the viewing screen. In this manner the tube 66 acts as guide member for the viewing screen between an inward position, defined by the tube 66 impinging against shoulder 64, and an outward position to which the projection systems are focused. The outward position is defined by a stop member 78 coupled to the mounting member 58. The stop member in one form comprises a washer 80 and a screw 82 which is threaded into an outwardly extending post 84 at the bottom of the mounting member. The washer 80 contacts an outward face 86 of the framing member 72 to limit the outward movement of the guide tube 66 and the framing member.

The viewing screen is normally urged toward the outward position by a pair of spring members, one of which is shown at 88. Each spring member is mounted on a pin 90 which extends from the mounting member through a downwardly extending lip 94 of the framing member 72. The spring member 88 is normally slightly compressed to exert an outward force on the lip 94 and hence tends to maintain the viewing screen in the outward position defined by the framing member 72 impinging against the washer 80. The spring member 88 also operates as a return mechanism to return the viewing screen 56 to the normal outward position after the viewing screen has been released from its inward position defined by the shoulder 64.

In this manner the viewing screen 56, as mounted in the framing member 72, defines a push-button arrangement—a force applied by the operator to the face of the viewing screen causing the viewing screen to move to its inward position and a release of the force causing the viewing screen to return to its normal outward position.

To complete the switch structure of the display switch of the present invention, means are included for sensing the movement of the viewing screen. As briefly described above, the means for sensing the movement of the viewing screen may be utilized in actuating control circuitry remote from the display switch as well as display selector circuitry for exciting particular projection systems within the housing 10. By way of example only, the means for sensing the movement of the viewing screen is shown to comprise a switch 95 mounted on the mounting member 58. The switch 95 may be of any commercially available type. The switch operates to actuate a contact unit 96 which is operatively coupled thereto.

As illustrated, the switch 95 is coupled to the mounting member through an upwardly extending flange 98. Briefly, the switch 95 in one form includes a frame member 99 for supporting first and second movable switch elements 100 and 102. The switch elements 100 and 102 are normally maintained in a predetermined position by a spring member 104 which is mounted between the switch elements. In its normal position, the switch element 102 is maintained immediately against a pair of movable contact elements 106 and 108 of the contact unit 96. The contact elements 106 and 108 are movable between inward and outward positions and are normally maintained in the inward position by the pressure contact of the switch element 102. Associated with the contact members 106 and 108 is a plurality of externally extending contact terminals 110 which provide an electrical connection to control circuitry remote from the display switch. Extending through the flange 98 is a push-button arrangement 112. The button arrangement 112 is movable relative to the flange 98. Movement of the button 112 toward the switch element 100 produces a like movement of the element 100 causing the spring to be stretched releasing the switch element 102 from against the contact elements 106 and 108. The contact elements 106 and 108 are then free to move to the outward position actuating the contact unit and operate control circuitry coupled to the terminals 110.

To actuate the switch 95 in response to movement of the viewing screen 56 a finger member 114 is coupled to the framing member 72. The finger 114 extends from the framing member adjacent to the viewing screen 56 to an outward extending face of the button 112. Thus, movement of the viewing screen 56 presses the finger member 114 against the button 112. Movement of the button 112 in turn actuates the switch 95 and contact unit 96 in the above described manner to institute control operations by remotely located control circuitry.

Accordingly, in the overall operation of the display switch, one of the projection systems within the housing is energized to project a predetermined symbol on the viewing screen in its outward position. The symbol is viewed by an operator who depresses the face of the viewing screen to its inward position. The movement of the viewing screen is sensed and actuates a switch to initiate controlled operations corresponding to the symbol originally displayed. Thus, by use of the display switch of the present invention an operator viewing a symbol projected on the viewing screen may proceed to directly initiate the operations indicated by the particular symbol.

A typical system employing the display switch is illustrated in FIGURE 3. As represented, the terminals 26 of the terminal plate 24 and the contact terminals 110 are coupled to a control circuit 116. The control circuit 116, for example, may include a stepping switch (not shown) of any well-known type which is actuated in response to the operation of the switch 95. The stepping switch, in turn, actuates particular control circuitry within the control circuit 116 as well as energizing particular ones of the projection system in the housing 10.

Thus an operator, in viewing a symbol on and pressing the viewing screen 56 in a direction indicated by the arrow 118, actuates the switch 95. The actuation of the switch 95 causes a signal to be transmitted to the control circuit 116 as indicated by the arrow 120. In response to the actuation of the switch 95, the control circuit 116 performs predetermined operations and transmits a signal to a selected one of the terminals 26, as indicated by arrow 122, to initiate the display of a new symbol on the viewing screen 56.

In this manner the switch 95 (means for sensing the movement of the viewing screen 56) is operatively associated with the projection systems in the housing 10 and may be utilized to directly control the selection of symbols to be displayed on the viewing screen 56.

What is claimed is:

1. A display apparatus comprising: a housing; a viewing screen; a projection system mounted within the housing for projecting an image on the viewing screen; mounting means coupled to the housing for mounting the viewing screen for limited movement relative to the housing in response to a force applied to the viewing screen, the mounting means including means for normally mounting the viewing screen in a predetermined position relative to the housing whereby an image is focused on the viewing screen; and means operatively associated with the viewing screen for sensing the movement of the viewing screen to actuate means for selectively energizing the projection system.

2. In a display apparatus including a housing, a viewing screen, and a plurality of individually operable projection systems mounted within the housing for projecting images onto the viewing screen, the combination of: mounting means coupled to the housing for mounting the viewing screen for limited movement relative to the housing in response to a force applied to the viewing screen, the mounting means including means for supporting the screen in a predetermined position relative to the housing whereby an image projected by a projection system is focused on the viewing screen; and means operatively associated with the viewing screen for sensing the movement of the viewing screen to actuate means for selectively energizing one of the projection systems.

3. A display apparatus comprising: a housing having an opening therein; a viewing screen; a guide member positioned for sliding movement within the opening; means for coupling the viewing screen to the guide member to extend across the opening remote from the housing; means for limiting the sliding movement of the guide member between an inward and an outward position within the opening; means for normally urging the guide member to the outward position; electrical switch means associated with the guide member for actuation responsive to movement of the guide member; and a plurality of individually operable projection means mounted within the housing for projecting a selectable image on the viewing screen when the guide member is in one position.

4. A display apparatus comprising: a housing; means defining an opening in the housing; a translucent viewing screen; a guide member positioned for inward and outward sliding movement within the opening; a frame member coupled to the guide member for mounting the viewing screen across the opening remote from the housing; means for limiting the inward sliding movement of the guide member; means coupled between the housing and the guide member for normally urging the guide member to an outward position; electric switch means associated with the guide member for actuation responsive to sliding movement of the guide member; and a plurality of individually operable image-projection means mounted in the housing and focused on the viewing screen for projecting a selectable image on the viewing screen when the guide member is in one position.

5. In a display apparatus including a housing having an opening, a translucent viewing screen, and a plurality of individually operable image-projection systems mounted in the housing for focusing an image on the screen, the combination of: a guide member positioned for inward and outward sliding movement within the opening; means for coupling the viewing screen to the guide member to extend across the opening; means for limiting the inward movement of the guide member within the opening; means for normally urging the guide member to an outward position within the opening; and sensing means operated by the guide member for sensing the movement of the guide member and means responsive to said sensing means for selectively energizing one of the projection systems.

6. A display apparatus comprising: a housing; a viewing screen for receiving projections from the rear and being viewed from the front; means coupled to the housing and mounting the viewing screen for limited movement between an inward and an outward position relative to the housing; means coupled between the housing and the viewing screen for urging the viewing screen toward the outward position; sensing means operated by the viewing screen for sensing the movement of the viewing screen; a plurality of individually operable image-projection systems mounted in the housing and focused on the viewing screen in the outward position and means responsive to said sensing means for selectively energizing the image projection system.

7. A display apparatus comprising: a housing; an electrical switch; a push-button mounted on the housing in operative association with the switch, the push-button having a translucent viewing screen extending across the face thereof; and a plurality of individually operable projection systems including light energizing means responsive to an operation of the switch and mounted in the housing to focus an image on the screen.

References Cited by the Examiner

UNITED STATES PATENTS

| 2,437,555 | 3/48 | Rees | 340—252 X |
| 2,981,941 | 4/61 | Ogle | 340—378 |
| 3,041,600 | 6/62 | Gumpertz | 340—378 |

NEIL C. READ, *Primary Examiner.*

ROBERT H. ROSE, *Examiner.*